G. T. HUDGENS.
TRACTOR.
APPLICATION FILED SEPT. 7, 1917.

1,290,748.

Patented Jan. 7, 1919.
3 SHEETS—SHEET 1.

Witnesses

G. T. Hudgens, Inventor
by C. A. Snow & Co.
Attorneys

G. T. HUDGENS.
TRACTOR.
APPLICATION FILED SEPT. 7, 1917.

1,290,748.

Patented Jan. 7, 1919.
3 SHEETS—SHEET 2.

Witnesess

G. T. Hudgens, Inventor
C. A. Snow & Co.
Attorneys

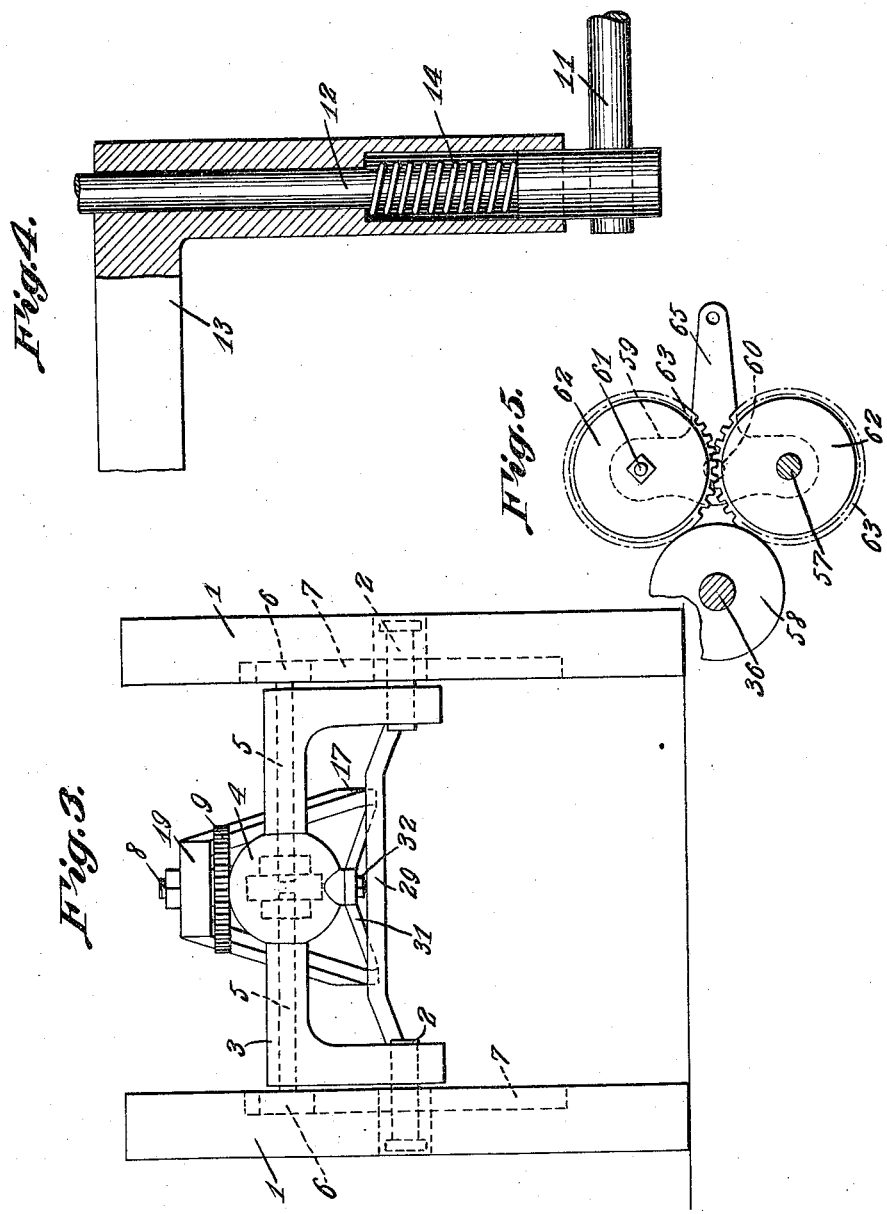

UNITED STATES PATENT OFFICE.

GEORGE THOMAS HUDGENS, OF LUFKIN, TEXAS.

TRACTOR.

1,290,748.  Specification of Letters Patent.  Patented Jan. 7, 1919.

Application filed September 7, 1917.  Serial No. 190,183.

*To all whom it may concern:*

Be it known that I, GEORGE THOMAS HUDGENS, a citizen of the United States, residing at Lufkin, in the county of Angelina and State of Texas, have invented a new and useful Tractor, of which the following is a specification.

The present invention relates to motor-propelled vehicles, and more particularly to a tractor designed especially for agriculture purposes for pulling plows, harrows, cultivators, harvesters, and the like, and for general farm work, although it can be used for other purposes.

It is the object of the invention to provide a frame and running gear for the tractor of novel construction, to facilitate steering and enable short turns to be made.

A further object of the invention is the provision in a tractor of the nature indicated, novel means for transmitting the power from the engine to the driving wheels without interfering with the steering.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:—

Fig. 3 is a rear end view showing the rear axle and accompanying part 5.

Fig. 4 is a sectional detail of the front axle.

Fig. 5 is a detail view of the gearing for swinging the main frame and rear axle relatively when steering to make a short turn.

Figure 1:
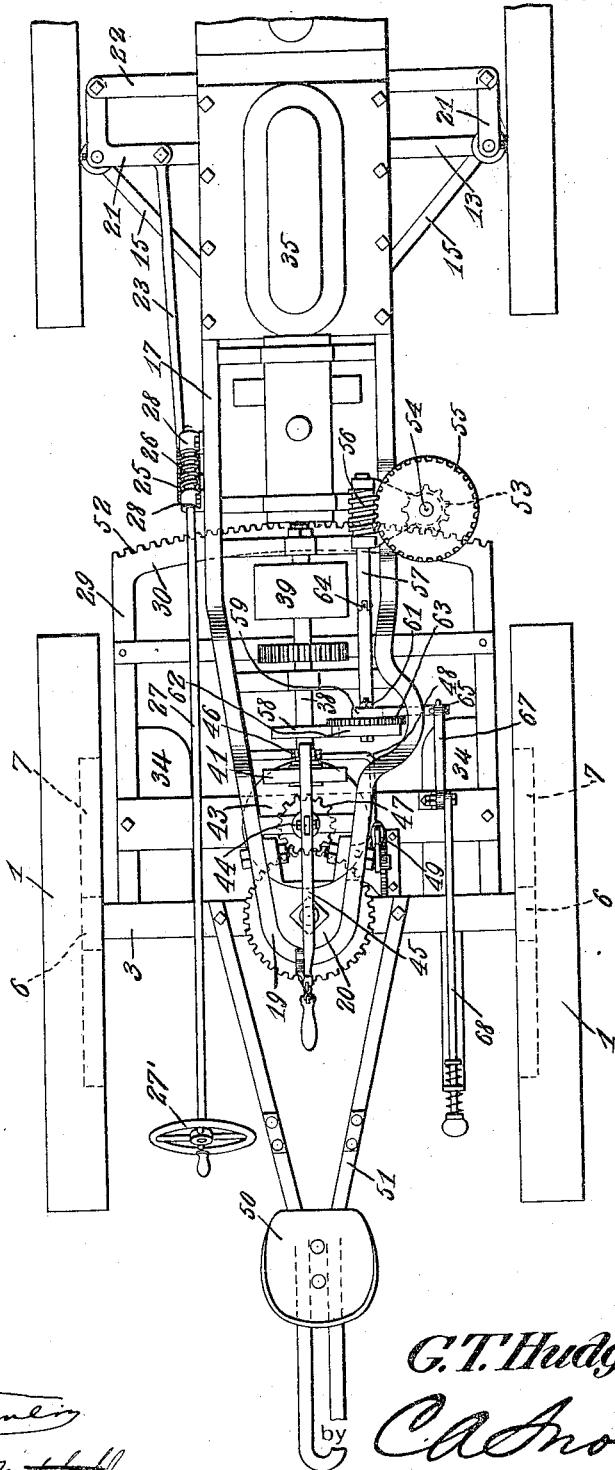
Figure 1 is a plan view of the tractor.
Figure 2:
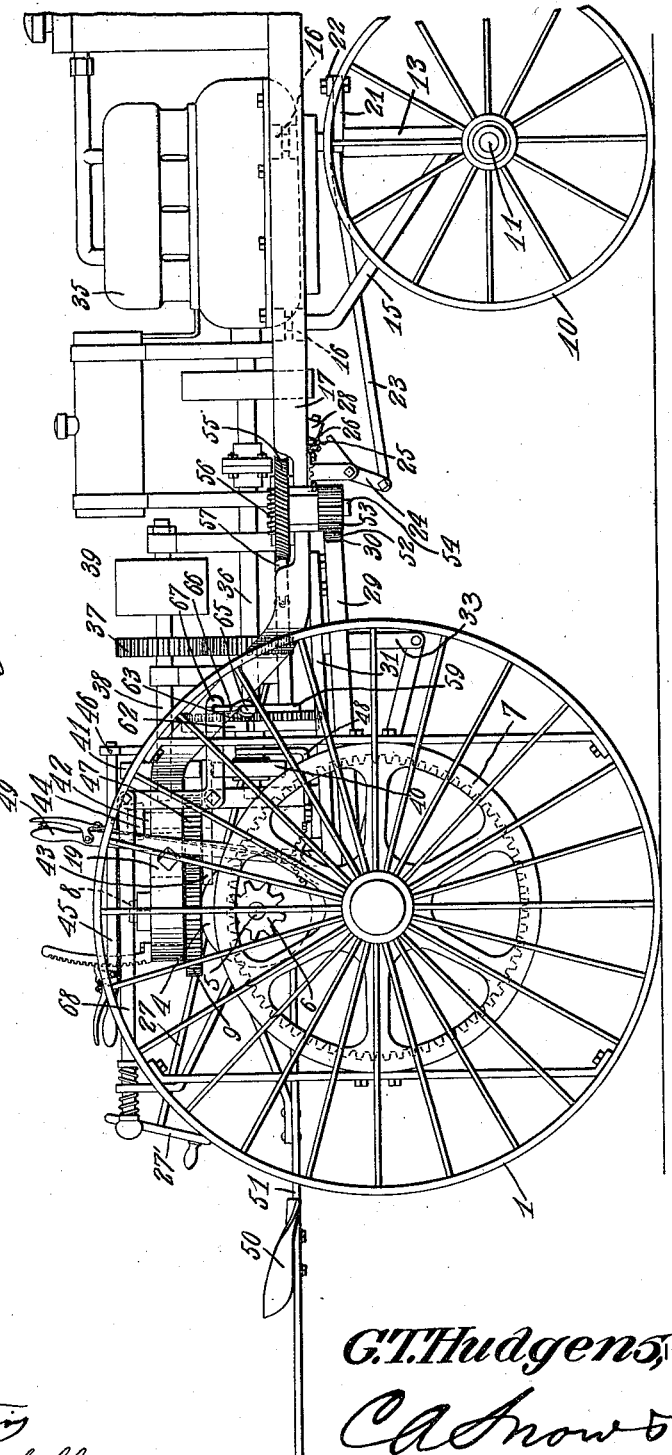
Fig. 2 is a side elevation thereof.

The driving wheels 1 are journaled for rotation upon the outstanding spindles 2 of the rear arched axle 3, said axle being adapted to move astride the row being worked. The arched axle 3 has a differential casing 4 housing an ordinary differential gearing from which shafts 5 extend to opposite sides through the upper portion of the arched axle. Pinions 6 are secured to the remote ends of the shafts 5 and mesh with internal gears 7 of relatively large diameter secured in any suitable manner to the wheels 1 at the inner sides thereof. Projecting upwardly from the case 4 is a shaft 8 from which the power is transmitted by way of the differential gearing to the shafts 5, which drive the wheels 1. A gear wheel 9 is secured upon the shaft 8 above the differential case 4 and rotates in a horizontal plane about the vertical axis of the shaft 8, for rotating said shaft.

The steering wheels 10, which are preferably of smaller diameter than the rear wheels 1, are journaled upon outstanding spindles 11 attached to the lower ends of vertical steering shafts 12 journaled within the limbs of the arched front axle 13. Said arched front axle also straddles the row over which the tractor moves, as well as the rear axle. Coiled springs 14 are housed in the axle 13 and are confined between said axle and shafts 12 and yieldably support the forward end of the frame. An arched radius member 15 has its ends secured to the limbs of the front axle 13 and extends rearwardly and upwardly, and said front axle and radius member 15 are provided at their upper portions with upstanding bearings 16 pivoted within the longitudinal main frame near the forward end thereof, thereby permitting the front axle to swing vertically in a transverse plane relatively to the frame in passing over obstructions. The radius member 15 braces the front axle and swings as a unit therewith.

The frame 17 can be of any suitable construction, its forward terminal extending over the front axle, and its rear portion being offset upwardly, as at 19, and being provided with a bearing 20 rotatably embracing the shaft 8, to serve as a pivotal connection between the frame 17 and rear axle, enabling the same to swing about a vertical axis relatively to one another, the bearing 20 being preferably above the gear wheel 9.

The steering gear for the wheels 10 embodies arms or levers 21 secured to the upper ends of the shafts 12 and connected by a link 22. A link 23 connected to one of the levers 21 is connected to a lever 24 pivoted to the frame 17 at one side thereof between its ends. The lever 24 has a worm wheel segment 25 meshing with a worm 26 secured upon a rearwardly extending shaft 27 journaled in bearings 28 secured to the frame 17, the rear end of the shaft 27 having a hand wheel 27' or other suitable operating member for rotating said shaft, which will oscillate the lever 24 and therefore oscillate the arms or levers 21 to rock the shafts 12 and angle the wheels 10 relatively to the frame 17, in the manner of an ordinary automobile steering gear.

A U-shaped beam 29 has terminals secured to the limbs of the rear axle 3, and the intermediate portion 30 of the beam 29 is curved to extend transversely under the frame 17 immediately in advance of the offset portion thereof, whereby to brace the structure. Attached to the frame 17 immediately in front of the upwardly offset portion 18 is a rearwardly extending brace 31 pivotally connected, as at 32, to the differential case 4 below and coaxial with the shaft 8, to further brace the framework.

The beam 29 has depending hangers 33 at opposite sides, for the connection of plow beams, draw bars, or the like, and platforms 34 are attached to the terminals of the beams 29 and rear axle 3 for supporting lifting devices or the like for the plows, cultivators or the like.

Mounted upon the forward portion of the frame 17 is a suitable engine 35 having a radiator, controlling means and other accessories, as usual in motor-propelled vehicles. The drive shaft 36 extends longitudinally rearward from the engine 35, being carried by the frame 17 having suitable bearings for said shaft. The shaft 36 is connected by gear wheels 37 or other suitable connection with a longitudinal counter shaft 38 carried by the frame 17 above the shaft 36, and the shaft 38 has a pulley wheel 39 thereon which can be belted to a pump, an electric generator, or other machine, to be driven by the tractor when it is used as a power plant.

Friction wheels 40 and 41 are mounted on the shafts 36 and 38 to rotate therewith, and a vertical shaft 42 is carried by the frame 17 and its brace 31, a horzontal friction disk 43 being secured to the vertical shaft 42 and projecting between the friction wheels 40 and 41 which are spaced apart vertically. A hand lever 45 is fulcrumed on the frame 17, as at 46, and has a swivel connection, as at 44, with the upper end of the shaft 42, for raising and lowering the disk 43 to ordinarily engage it with the friction wheels 40—41. Secured upon the shaft 42 is a gear wheel 47 above the disk 43 meshing with the gear wheel 9. Thus, when the friciton disk 43 is moved downwardly into engagement with the friction wheel 40, this will rotate the wheel 43 and gear wheel 47 in one direction from the shaft 36, thereby transmitting the motion by way of the gear wheel 9, shaft 8, differential gearing and shafts 5 to the rear wheels 1, to propel the tractor forward. By raising the disk 43 into engagement with the friction wheel 41, which rotates in a direction reverse to the direction of rotation of the friction wheel 40 and shaft 36, the disk 43 is rotated in the opposite direction, thereby reversing the rotation of the wheels 1, and backing the machine. The gear wheel 47 has a sliding engagement with the teeth of the gear wheel 9, permitting the gear wheel 47 to shift vertically with the shaft 42 and friction disk 43.

The friction disk 40 is feathered or slidable on the shaft 36, whereby it can be moved toward and away from the shaft 42, to change the speed, when moving forwardly. Thus, a link 48 engaging the grooved hub of the friction wheel 40 is connected to a hand lever 49 pivoted on the brace 31, whereby the speed can be controlled.

The operator's seat 50 is mounted upon a supporting bar 51 secured to the rear axle, and the hand wheel 27', levers 45—49 and other operating members are within convenient reach of the operator.

As a means for swinging the rear axle and frame 17 relatively, the arcuate portion 30 of the beam 29 is in the form of a rack, having the rack teeth 52 meshing with a pinion 53 secured upon a short vertical shaft 54 journaled to the frame 17. A worm wheel 55 is also secured upon the shaft 54 and meshes with a worm 56 secured upon a shaft 57. A friction wheel 58 is secured upon the engine shaft 36 for operating the shaft 57, and for this purpose, a rocking member 59 is journaled between its ends, as at 60, to the frame 17, the shaft 57 being journaled in one arm of the member 59, and a shaft 61 being journaled in the other arm thereof. Friction wheels 62 are secured to the shafts 57 and 61, to move with the arms of the member 59 into alternate frictional engagement with friction wheel 58. The shafts 57 and 61 have the meshing gear wheels 63, whereby the friction wheels 62 operate simultaneously in opposite directions. The shaft 57 has a flexible connection 64 therein, permitting the member 59 to oscillate without interfering with the transmissional of power.

The member 59 has an arm 65 connected by a link 66 with a bell crank lever 67 pivoted to the frame 17, and to which an operating rod 68 is connected, whereby the operator, by reciprocating the rod 68, can oscillate the member 59 to bring either friction wheel 62 into engagement with the friction wheel 58. When one friction wheel 62 is moved into engagement with the friction wheel 58, the shaft 57 is rotated in one direction, whereby to rotate the pinion 63 in one direction for swinging the rear axle and frame 17 in one direction relatively, whereas when the other friction wheel 62 engages the friction wheel 58, the motion will be reversed, thereby swinging the rear axle and the frame 17 in the other direction. The operator merely controls the movement of the member 59 for breaking the connection or making it to operate the gearing in either direction from the shaft 36 driven by the engine, thereby relieving the operator of the burden of swinging the rear axle and frame 17 relatively.

The operation of the tractor will be obvious from the foregoing, it being noted that when the frame 17 and rear axle swing relatively, this will not disturb the transmission of power from the engine to the rear wheels 1, since the frame 17 swings about the shaft 8 through which the power is transmitted. The direction of propulsion is controlled by shifting the friction disk 43, and the forward speed is controlled by shifting the friction wheel 40, as explained above. For ordinary steering purposes, the hand wheel 27' is rotated to angle the steering wheels 10, but when it is desired to make a short turn, in addition to the angling of the wheels 10 with respect to the frame 17, said frame can be moved toward the respective side by throwing the proper friction wheel 62 into engagement with the friction wheel 58. The frame 17 will therefore be moved or swung toward one side, and the wheel 10 being swung with the shafts 12 in the corresponding direction will enable a short turn to be made.

Having thus described the invention, what is claimed as new is:—

1. A tractor embodying a rear axle, drive wheels therefor, a vertical shaft carried by the rear axle, a frame pivotally connected with the rear axle to swing about the axis of said shaft, steering wheels for said frame, means for swinging said frame relatively to the axle, an engine carried by said frame, vertically spaced friction wheels carried by said frame and operated in opposite directions by said engine, and a vertically shiftable friction disk connected to said shaft and movable between said friction wheels to engage them alternately.

2. A tractor embodying a rear axle, drive wheels therefor, a vertical shaft carried by the rear axle, a frame pivotally connected with the rear axle to swing about the axis of said shaft, steering wheels for said frame, means for swinging said frame relatively to the axle, an engine carried by said frame, vertically spaced friction wheels carried by said frame and operated in opposite directions by said engine, a vertically shiftable friction disk connected to said shaft and movable between said friction wheels to engage them alternately, means carried by said frame for raising and lowering the friction disk, one of the friction wheels being shiftable, and means for shifting said friction wheel relatively to the friction disk to change the speed.

In testimony that I claim the foregoing as my own, I have hereto affixed my signature in the presence of two witnesses.

GEORGE THOMAS HUDGENS.

Witnesses:
W. R. FULLER,
J. J. GUNTER.

Copies of this patent may be obtained for five cents each, by addressing the "Commissioner of Patents, Washington, D. C."